(12) United States Patent
Nazari et al.

(10) Patent No.: US 11,989,705 B2
(45) Date of Patent: May 21, 2024

(54) METHODS AND SYSTEMS FOR TRANSACTIONS TRANSFER

(71) Applicant: Credit Sesame, Inc., Mountain View, CA (US)

(72) Inventors: Adrian Nazari, Los Altos, CA (US); Julian Konomi, Toronto (CA); Shawn Kumar, Toronto (CA); Bradley Arsenault, Mountain View, CA (US)

(73) Assignee: Credit Sesame, Inc., Mountain View, CA (US)

( * ) Notice: Subject to any disclaimer, the term of this patent is extended or adjusted under 35 U.S.C. 154(b) by 0 days.

(21) Appl. No.: 17/969,644

(22) Filed: Oct. 19, 2022

(65) Prior Publication Data
US 2024/0135343 A1 Apr. 25, 2024

(51) Int. Cl.
*G06Q 20/10* (2012.01)
(52) U.S. Cl.
CPC .................................... *G06Q 20/10* (2013.01)
(58) Field of Classification Search
CPC ........................................................ G06Q 20/10
USPC .............................................................. 705/39
See application file for complete search history.

(56) References Cited

U.S. PATENT DOCUMENTS

| 9,372,879 | B1* | 6/2016 | Evenson | ............. G06F 16/2228 |
| 2013/0204638 | A1* | 8/2013 | Lan | ........................ G06Q 40/02 705/2 |
| 2014/0279352 | A1* | 9/2014 | Schaefer | ............... G06Q 40/04 705/37 |
| 2019/0378137 | A1* | 12/2019 | Honey | ............... G06Q 30/0635 |

* cited by examiner

*Primary Examiner* — Bennett M Sigmond
*Assistant Examiner* — Michael J Warden
(74) *Attorney, Agent, or Firm* — Chhabra Law Firm, PC

(57) ABSTRACT

Using various embodiments, methods and systems for implementing secure transaction transfers are described. In one embodiment, a system performing the techniques described herein maintains a multi key index associated with a plurality of financial transactions using a self-balanced sorted tree data structure. Thereafter, the system reads/stores the self-balanced sorted tree data structure into memory and applies a filtering algorithm on the self-balanced sorted tree data structure to determine at least one qualifying financial transaction out of the plurality of financial transactions. The system selects the at least one qualifying financial transaction if it does not exceed a predetermined value. In one embodiment, the predetermined value is determined based on an available maximum utilization amount available to a user. Thereafter, the system transfers the selected at least one qualifying financial transaction to a secured credit card.

20 Claims, 5 Drawing Sheets

METHODS AND SYSTEMS FOR TRANSACTIONS TRANSFER

FIELD OF THE INVENTION

Embodiments of the present invention relates generally to financial transactions. More particularly, embodiments of the invention relate to build ones credit through secured transactions using an optimized software solution.

BACKGROUND OF THE INVENTION

A user's financial responsibility is generally determined by the credit history or credit score maintained by the credit bureaus. However, an issue arises when the user cannot receive credit to develop or build their credit.

While conventional secured credit cards can be used to establish, strengthen or rebuild ones credit, they are cumbersome and not user friendly. Moreover, it is estimated that about 60% consumers in the United States use debit cards as their preferred form of payment method, and thus never get to utilize (and thus build) their credit score/report. In other words, one flaw in the credit rating systems employed by the major credit reporting bureau's is that those systems seem impervious to consider a consumer's income, cash-on-hand (cash or cash equivalents), or other assets that may be used to determine the consumer's credit worthiness. Therefore, methods, systems, and techniques are required that can be implemented through software solutions to overcome the identified shortcomings of existing credit rating systems.

SUMMARY OF THE DESCRIPTION

Using various embodiments, systems, methods, and techniques are disclosed to perform transactions transfer from a user's debit card to a secured credit card. The techniques described herein, broadly include, but are not limited to, assisting a user to build their credit history using secured credit transactions that are linked with a user's cash (or checking) account.

In one embodiment, a system performing the techniques described herein maintains a multi key index associated with a plurality of financial transactions using a self-balanced sorted tree data structure. Thereafter, the system reads/stores the self-balanced sorted tree data structure into memory and applies a filtering algorithm on the self-balanced sorted tree data structure to determine at least one qualifying financial transaction out of the plurality of financial transactions. The system selects the at least one qualifying financial transaction if it does not exceed a predetermined value. In one embodiment, the predetermined value is determined based on an available maximum utilization amount available to a user. Thereafter, the system transfers the selected at least one qualifying financial transaction to a secured credit card.

In other embodiment, the multi key index can be associated with a transaction type, amount, and date of transaction of the plurality of financial transactions. The filtering algorithm, in one embodiment, calls a specialized function that accepts a value of the element, an index of the element, and an object being traversed and returns a value that is coercible to a Boolean value. The filtering algorithm can also call the specialized function once for each element in the self-balanced sorted tree data structure. In another embodiment, the specialized function constructs a new data structure for all the values for which specialized function returns true.

In one embodiment, the at least one qualifying financial transaction, includes determining whether the transaction has been posted prior to a predetermined period. In another embodiment, the at least one qualifying financial transaction is transferred from at least one of a user's debit card or a bill pay financial transaction to the secured credit card.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" or "another embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g., circuitry, dedicated logic, etc.), software, or a combination of both. Although the processes are described below in terms of some sequential operations, it should be appreciated that some of the operations described can be performed in a different order. Moreover, some operations can be performed in parallel rather than sequentially.

Figure 1:
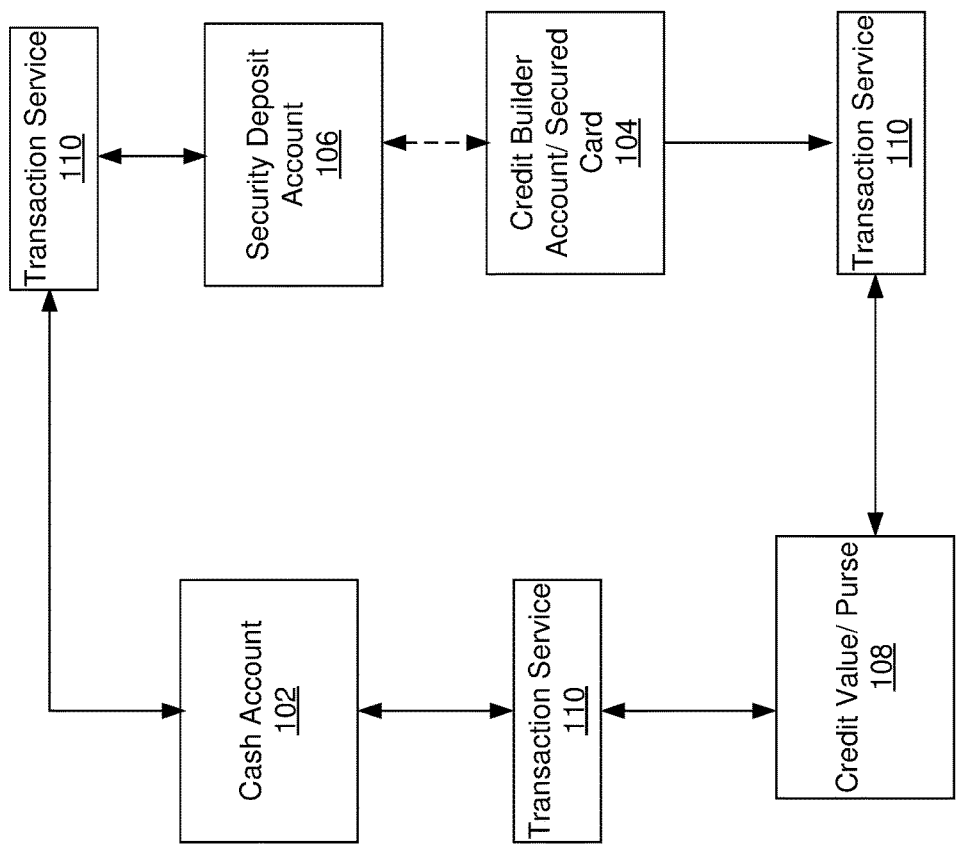
FIG. 1 is a block diagram illustrating the components of a transaction transfer system, in accordance with one embodiment of the invention.

FIG. 1 is a block diagram illustrating the components of a transaction transfer system, in accordance with one embodiment of the invention. The blocks shown in FIG. 1 are defined further herein in order to provide a better understanding the invention. The following definitions should not be construed to be limiting the scope of the invention in any form or manner:

Cash Account 102—A debit account that serves as the user's main account. It comes with Automated Clearing House (ACH) numbers for making transfers and a debit card for making purchases. All the funds that the user loads into the system get deposited in this account.

Credit Builder Account/Secured card 104—A Secured credit card account. No physical card or card numbers available to the user. A security deposit is required to get a credit limit for the same amount.

Security Deposit Account 106—A separate account that is tied to the Credit Builder Account 104 used to store a security deposit. In one embodiment, this account is not available to the user and the funds are returned to the user only when they opt-out of the system. The balance on this account matches the credit limit on the credit builder account/secured card 104 (signified by the dashed line between account 104 and 106).

Credit Vault/Purse 108—An optional separate account that is tied to Cash Account 102, used to keep the funds the user spends on the credit builder account/secured card 106. The credit received is deposited in purse 108 and used to make a credit card payment at a predetermined time (e.g., without limitation, a few minutes, hours, days, the end of the month, etc.). This balance shows as separate from the cash balance in account 102 and the user can, optionally, withdraw it into cash account 102 with a warning. In embodiments where Credit Vault 108 is not implemented, the funds remain in the user's Cash Account 102 and thus, the credit card payments are withdrawn directly from the user's Cash Account 102. Thus, in such embodiments the tasks performed by Credit Vault 108, as described herein, can be performed or implemented through Cash Account 102.

Transaction Service 110—A third party service that integrates the system with the partner banks and credit card network (e.g., Visa, MasterCard, etc.). The third parties provide SOAP API to open accounts, issue cards, and make money transfers between different accounts. Transaction service 110 also provides web-hook notifications about transactions to the users' accounts.

In one embodiment, a user can use their cash in account 102 towards building their credit by receiving a credit limit. Since credit builder account 104 utilizes a secured card, the credit limit equals the security deposit in account 106. In one embodiment, cash from the user's cash account 102 can be transferred to account 106 through transaction service 110 to other accounts as described herein. The amount in security deposit account 106 becomes the credit line available to the user which is reported to the credit bureau and counts towards the user's credit score.

Thereafter, the user can only use cash account 102 (e.g., associated debit card, bill pay transaction, etc.) to make daily purchases and the system picks qualifying transactions and moves them to their credit account 104 so they get reported to the credit bureau. In one embodiment, this can be performed using a transaction transfer algorithm, as illustrated further herein. Equivalent funds for the selected qualifying transactions are transferred to credit vault 108. Therefore, effectively, the user has borrowed funds on credit builder account/secured card 104, and at the end of each payment cycle the funds deposited in credit vault 108 are used to make a payment to satisfy the borrowed funds on secured card 104. After each transfer the utilization status and statement balance of the user's account is updated on the corresponding credit statement record.

Figure 2:
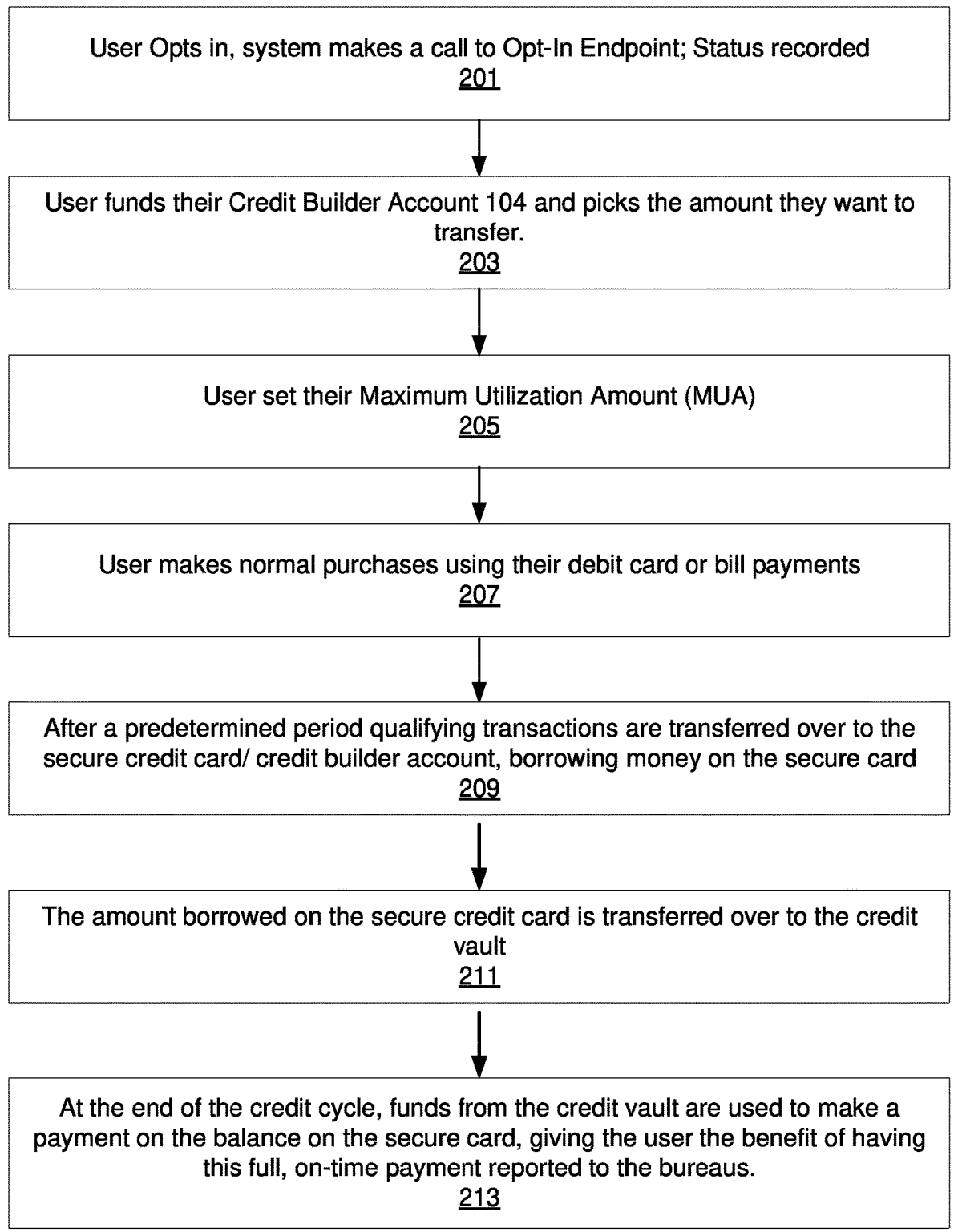
FIG. 2 illustrates a flow chart for a user utilizing a system, according to one embodiment of the present invention.

FIG. 2. illustrates a flow chart for a user utilizing a system, according to one embodiment of the present invention. At 201, a user opts in to the system by agreeing to the terms and conditions. The app makes a call to an opt-in endpoint. In one embodiment, the endpoint can be an Application Programming Interface (API) call. After the opt-in is called, the status of a Boolean value 'true' in a secured card settings collection. The opt-in date is stored as the current date and the status is recorded on the system. At 203, the user funds their credit builder account 104 and picks the amount they want to transfer. In one embodiment, this is achieved by making an API call to a create secured card endpoint. This endpoint allows the creation of a secured card that is associated with credit builder account 104. The security deposit Amount is specified using a request parameter. The amount provided in the request parameter is debited from the user's cash account 102 to their as the security deposit account 106 using transaction service 110. The new secured card is created and a credit vault account 108 is set.

At 205, the user set their Maximum Utilization Amount (MUA), which is the amount of money they would like to borrow on the secured card and pay it back at the end of a predetermined billing cycle. In a preferred embodiment, this is set to 30% of the user's credit limit as determined by the amount in their security deposit account 106. At 207, the user makes normal purchases using their debit card or bill payments using the system. The funds for these transactions are deducted from the user's cash account 102. At 209, after a predetermined period (e.g., a few minutes, hours, days, etc.) qualifying transactions are transferred over to the secured card/credit builder account 104.

At 211, the amount borrowed on the secured credit card is transferred over to the credit vault 108. At 213, at the end of the credit cycle, funds from the credit vault are used to make a payment on the balance on the secured card, giving the user the benefit of having this full, on-time payment reported to the bureaus.

Figure 3:
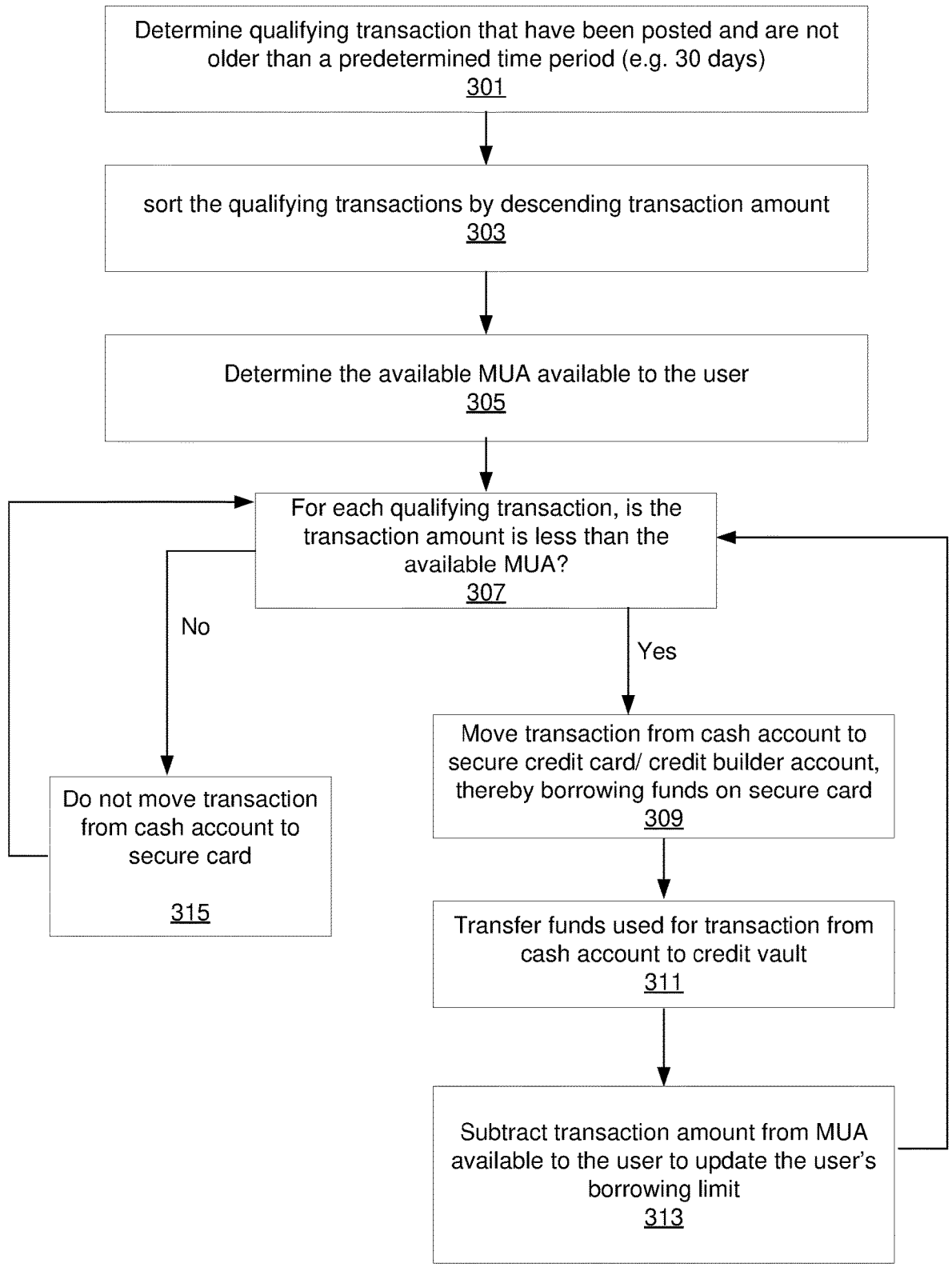
FIG. 3 illustrates a block diagram to determine a qualifying transaction that is transferred to the secured card, according to one embodiment of the present invention.

FIG. 3 illustrates a block diagram to determine a qualifying transaction that is transferred to the secured card, according to one embodiment of the present invention. As illustrated, at 301 qualifying transactions that have been posted, but are not older than a predetermined time period (e.g., a few minutes, hours, days, end of the month, etc.) are selected as qualifying transactions. At 303, the transactions are sorted by descending transaction amount. At 305, the MUA available to the user is determined. At 307, for each qualifying transaction, it is determined whether the transaction amount is less than the available MUA to the user.

If it is determined so, at 309, the transaction is moved from the cash account to the secured credit card, thereby borrowing funds on the secured card. In one embodiment, the funds are transferred using an Application Programming Interface (API) call to transaction service 110. The results from each transfer are saved in a database in real-time. Transferring a transaction from the user's cash account 102 to their secured card/credit builder account 104 involves transferring monies from the users debit card or bill pay transactions (associated with their cash account 102) to the user's secured card 104. Since the user has already paid for the transaction with their debit card, they do not re-pay for those merchants a second time. Since now the transaction is, in effect, made using borrowed money (using the user's secured card), the original amount used from the user's cash account/debit card to fulfill the transaction is transferred to the user's credit vault 108, as illustrated at 311.

In one embodiment, the funds accumulated in the credit vault are used to pay funds borrowed on the secured card, as illustrated at 213 in FIG. 2. At 313, the transaction amount is subtracted from the user's existing MUA to update the available MUA, that is, the amount the user is allowed to borrow on the secured card. If, however, the qualifying transaction is more than the available MUA, at 315, the transaction remains on the user's cash account and is not transferred to the secured card.

The above described process continues (and control passes back to 307) until all qualifying transactions are evaluated.

In one embodiment, an updated value for the available MUA (e.g., the value determined at 313) is stored in the database. Thereafter, the next time the process is implemented, to determine the user's available MAU (e.g., at 305) a maximum of the user's available MUA (stored in the database) and the MUA chosen by the user is selected. This is to account for cases where the user changed their MUA in the middle of their billing cycle.

Figure 4:
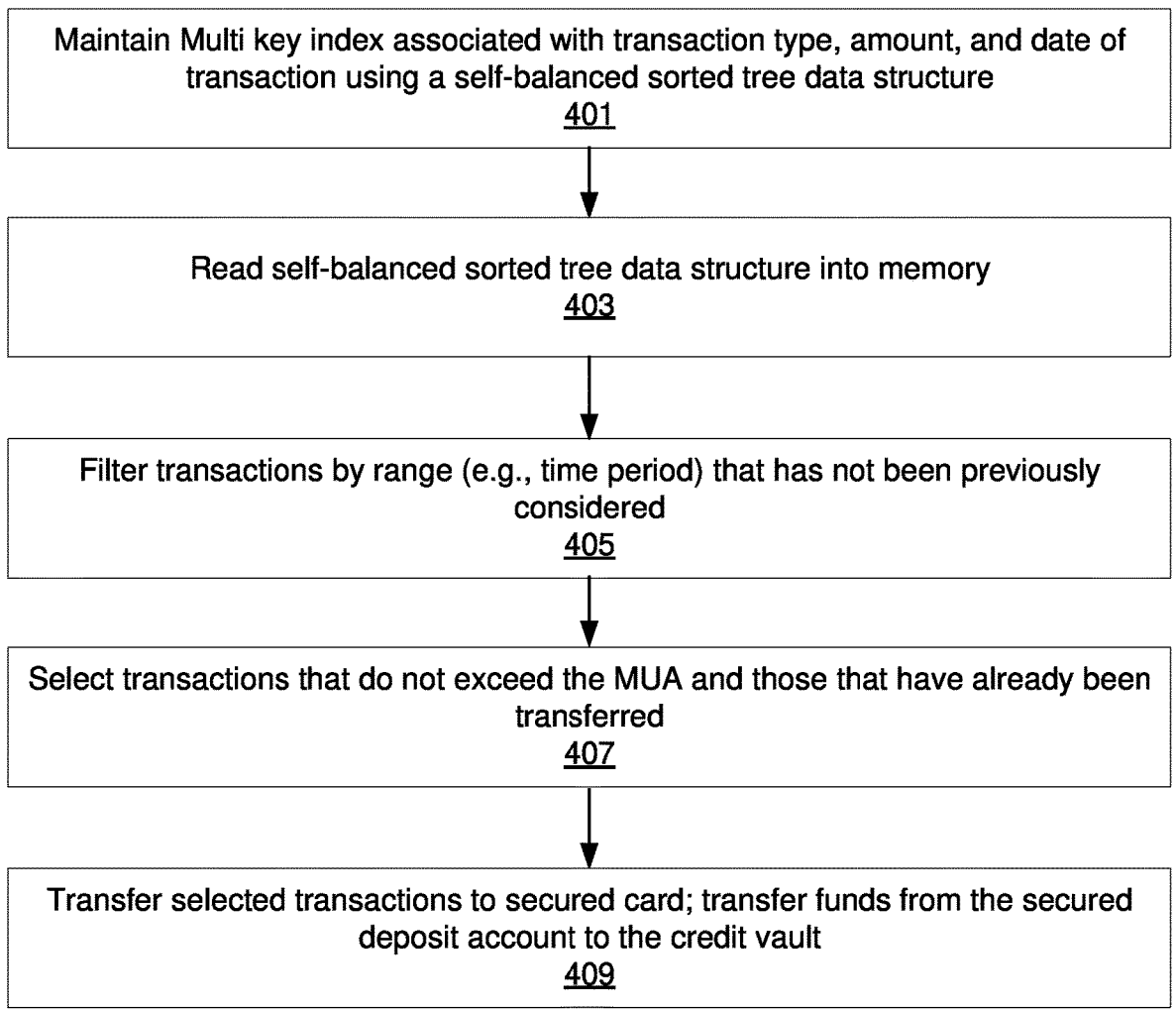
FIG. 4 illustrates a transaction transfer algorithm, according to one embodiment of the present invention.

FIG. 4 illustrates a transaction transfer algorithm, according to one embodiment of the present invention. The transaction transfer algorithm only selects a set of optimal transactions to move to the secured card for a user. In one embodiment, a computing system employs the transaction transfer algorithm to implement any aspect of the invention described herein. In one embodiment, all transactions that users make are stored in a database. In one embodiment, each transaction is stored on disk as a Binary JSON (BSON) document.

At 401, a multi key index is maintained with a transaction type, amount, and date of transaction. In one embodiment, the index uses a self-balancing sorted tree data structure (e.g., B-tree) maintained in memory. The sort order is maintained in logarithmic time when adding and removing documents. To further optimize the system, at 403, the entire B-tree is read into memory to avoid physical disk (e.g., hard disk) activity during the search.

In one embodiment, since the sort order is maintained, at 405, only a range of transactions need to be searched to determine the qualifying transactions. Once the optimal records are found, the transaction details are read from disk and returned to the system as a JSON object array.

After getting the set of qualifying transactions the system determines which transactions should be transferred to credit builder account 104 which would assist the user in building their credit. At 407, transactions that do not exceed the maximum utilization amount and those that have not already been transferred are retrieved by a filtering algorithm. The filtering algorithm calls a specialized function that accepts three arguments, namely, a value of the element, an index of the element, and an object being traversed, and returns a value that is coercible to a Boolean value. In one embodiment, the filtering algorithm calls the specialized function once for each element in the array, and constructs a new array of all the values for which specialized function returns true. At 409, the transactions are transferred to the secured card/credit builder account and equivalent funds are transferred from the secured deposit account to the credit vault. The transactions on the credit builder account are then reported to the credit bureaus to assist the user in building their credit history.

Using software technologies, the techniques described herein discloses a consumer's net worth that can be used to determine their 'true credit' and permit a system (or the consumer) to choose whether they want their true credit to be reflected in their credit rating reports. Except for utilizing software technologies, there is no equivalent mechanism to perform the tasks disclosed herein, by any conventional means. A consumer's net worth can be determined by their income, cash-on-hand (cash or cash equivalents, including, but not limited to cryptocurrency, 401K or other retirement accounts, liquid assets, stocks, other equities, etc.), or other assets that can be used to determine a user's credit worthiness.

The techniques described herein can assist the consumer to manage and automate their finances. For example, through machine learning/neural networks (e.g., artificial neural networks, simulated neural networks, etc.) artificial intelligence techniques can be utilized to determine a consumer's spending habits to optimize building a user's credit rating report (e.g., determine which transactions should be reported to the credit bureau). These artificial networks can also be used for predictive modeling, adaptive control, and for bootstrapping purposes. In some implementations, various statistical models can be used to determine a user's net worth over a period of time to automatically adjust their credit worthiness.

Figure 5:
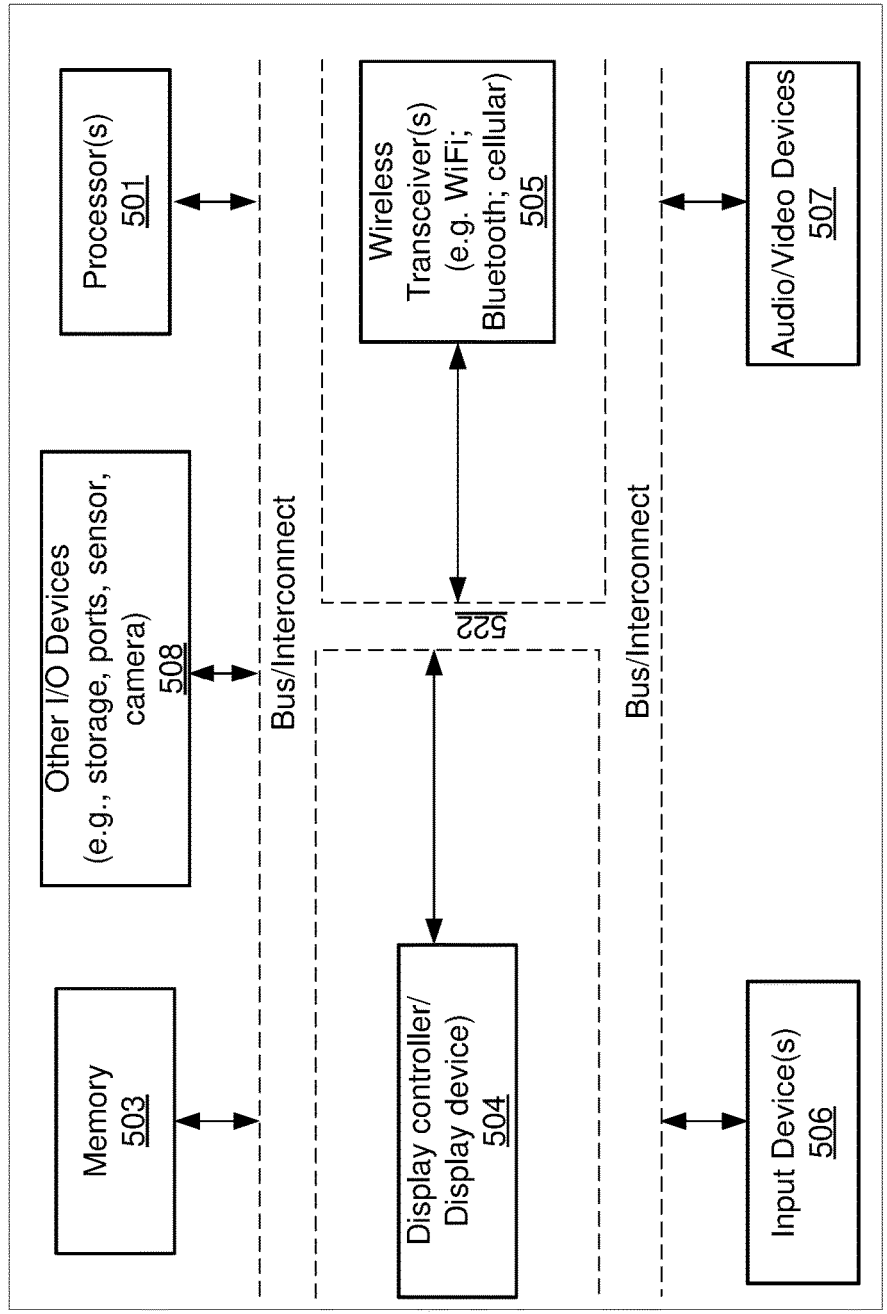
FIG. 5 is a block diagram illustrating a data processing system such as a computing system which may be used with one embodiment of the present invention.

FIG. 5 is a block diagram illustrating a data processing system such as a computing system 500 which may be used with one embodiment of the present invention. For example, system 500 can be implemented as part of any aspect of the current invention (e.g., transaction transfer algorithm). It should be apparent from this description that aspects of the present invention can be embodied, at least in part, in software. That is, the techniques may be carried out in a computer system or other computer system in response to its processor, such as a microprocessor, executing sequences of instructions contained in memory, such as a ROM, DRAM, mass storage, or a remote storage device. In various embodiments, hardware circuitry may be used in combination with software instructions to implement the present invention. Thus, the techniques are not limited to any specific combination of hardware circuitry and software nor to any particular source for the instructions executed by the computer system. In addition, throughout this description, various functions and operations are described as being performed by or caused by software code to simplify description. However, those skilled in the art will recognize what is meant by such expressions is that the functions result from execution of the code by a processor.

In one embodiment, system 500 can represent a computing system implementing the techniques described herein. System 500 can have a distributed architecture having a plurality of nodes coupled through a network, or all of its components may be integrated into a single unit. Computing system 500 can represent any of the data processing systems described above performing any of the processes or methods described above. In one embodiment, computer system 500 can be implemented as integrated circuits (ICs), discrete electronic devices, modules adapted to a circuit board such as a motherboard, an add-in card of the computer system, and/or as components that can be incorporated within a chassis/case of any computing device. System 500 is intended to show a high level view of many components of any data processing unit or computer system. However, it is to be understood that additional or fewer components may be present in certain implementations and furthermore, different arrangement of the components shown may occur in other implementations. System 500 can represent a desktop, a laptop, a tablet, a server, a mobile phone, a programmable logic controller, a personal digital assistant (PDA), a personal communicator, a network router or hub, a wireless access point (AP) or repeater, a set-top box, or a combination thereof.

In one embodiment, system 500 includes processor 501, memory 503, and devices 505-508 via a bus or an interconnect 522. Processor 501 can represent a single processor or multiple processors with a single processor core or multiple processor cores included therein. Processor 501 can represent one or more general-purpose processors such as a microprocessor, a central processing unit (CPU), Micro Controller Unit (MCU), etc. Processor 501 can be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions. Processor 501, can also be a low power multi-core processor socket such as an ultra low voltage processor, may act as a main processing unit and central hub for communication with the various components of the system. Such processor can be implemented as a system on chip (SoC).

Processor 501 is configured to execute instructions for performing the operations and methods discussed herein. System 500 further includes a graphics interface that communicates with graphics subsystem 504, which may include a display controller and/or a display device. Processor 501 can communicate with memory 503, which in an embodiment can be implemented via multiple memory devices to provide for a given amount of system memory. In various implementations the individual memory devices can be of different package types such as single die package (SDP), dual die package (DDP) or quad die package (QDP). These devices can in some embodiments be directly soldered onto a motherboard to provide a lower profile solution, while in other embodiments the devices can be configured as one or more memory modules that in turn can couple to the motherboard by a given connector. Memory 503 can be a machine readable non-transitory storage medium such as one or more volatile storage (or memory) devices such as random access memory (RAM), dynamic RAM (DRAM), synchronous DRAM (SDRAM), static RAM (SRAM), or other types of storage devices such as hard drives and flash memory. Memory 503 may store information including sequences of executable program instructions that are executed by processor 501, or any other device. System 500 can further include IO devices such as devices 505-508, including wireless transceiver(s) 505, input device(s) 506, audio IO device(s) 507, and other IO devices 508.

Wireless transceiver 505 can be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, network interfaces (e.g., Ethernet interfaces) or a combination thereof. Input device(s) 506 can include a mouse, a touch pad, a touch sensitive screen (which may be integrated with display device 504), a pointer device such as a stylus, and/or a keyboard (e.g., physical keyboard or a virtual keyboard displayed as part of a touch sensitive screen). Other optional devices 508 can include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Optional devices 508 can further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors can be coupled to interconnect 522 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, in one embodiment, a mass storage (not shown) may also couple to processor 501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on RE-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Note that while system 500 is illustrated with various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the invention.

Thus, methods, apparatuses, and computer readable medium to implement the techniques as described herein. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

The invention claimed is:

1. A system comprising:
   a memory device;
   a processing system, comprising at least one hardware core, coupled to the memory device, configure to:
   maintain a multi key index associated with a plurality of financial transactions using a self-balanced sorted tree data structure;
   read the self-balanced sorted tree data structure into the memory device;
   apply a filtering algorithm on the self-balanced sorted tree data structure to determine at least one qualifying financial transaction out of the plurality of financial transactions;
   select the at least one qualifying financial transaction if it does not exceed a predetermined value; and
   transfer the selected at least one qualifying financial transaction to a secured credit card.

2. The system of claim 1, wherein the multi key index is associated with a transaction type, amount, and date of transaction of the plurality of financial transactions.

3. The system of claim 1, wherein filtering algorithm calls a specialized function that accepts a value of the element, an index of the element, and an object being traversed and returns a value that is coercible to a Boolean value.

4. The system of claim 3, wherein the filtering algorithm calls the specialized function once for each element in the self-balanced sorted tree data structure, and wherein the specialized function constructs a new data structure for all the values for which specialized function returns true.

5. The system of claim 1, wherein to determine the at least one qualifying financial transaction, includes determining whether the transaction has been posted prior to a predetermined period.

6. The system of claim 1, wherein the predetermined value is determined based on an available maximum utilization amount available to a user.

7. The system of claim 1, wherein the at least one qualifying financial transaction is transferred from at least one of a user's debit card or a bill pay financial transaction to the secured credit card.

8. A method comprising:
   maintaining, by a computing device, a multi key index associated with a plurality of financial transactions using a self-balanced sorted tree data structure;
   reading the self-balanced sorted tree data structure into memory;
   applying a filtering algorithm on the self-balanced sorted tree data structure to determine at least one qualifying financial transaction out of the plurality of financial transactions;
   selecting the at least one qualifying financial transaction if it does not exceed a predetermined value; and
   transferring the selected at least one qualifying financial transaction to a secured credit card.

9. The method of claim 8, wherein the multi key index is associated with a transaction type, amount, and date of transaction of the plurality of financial transactions.

10. The method of claim 8, wherein filtering algorithm calls a specialized function that accepts a value of the element, an index of the element, and an object being traversed and returns a value that is coercible to a Boolean value.

11. The method of claim 10, wherein the filtering algorithm calls the specialized function once for each element in the self-balanced sorted tree data structure, and wherein the specialized function constructs a new data structure for all the values for which specialized function returns true.

12. The method of claim 8, wherein to determine the at least one qualifying financial transaction, includes determining whether the transaction has been posted prior to a predetermined period.

13. The method of claim 8, wherein the predetermined value is determined based on an available maximum utilization amount available to a user.

14. The method of claim 8, wherein the at least one qualifying financial transaction is transferred from at least one of a user's debit card or a bill pay financial transaction to the secured credit card.

15. A non-transitory computer readable medium comprising instructions, which when executed by a processing system implements a method comprising:
   maintaining a multi key index associated with a plurality of financial transactions using a self-balanced sorted tree data structure;
   reading the self-balanced sorted tree data structure into memory;
   applying a filtering algorithm on the self-balanced sorted tree data structure to determine at least one qualifying financial transaction out of the plurality of financial transactions;
   selecting the at least one qualifying financial transaction if it does not exceed a predetermined value; and
   transferring the selected at least one qualifying financial transaction to a secured credit card.

16. The non-transitory computer readable medium of claim 15, wherein the multi key index is associated with a transaction type, amount, and date of transaction of the plurality of financial transactions.

17. The non-transitory computer readable medium of claim 15, wherein filtering algorithm calls a specialized function that accepts a value of the element, an index of the element, and an object being traversed and returns a value that is coercible to a Boolean value.

18. The non-transitory computer readable medium of claim 17, wherein the filtering algorithm calls the specialized function once for each element in the self-balanced sorted tree data structure, and wherein the specialized function constructs a new data structure for all the values for which specialized function returns true.

19. The non-transitory computer readable medium of claim 15, wherein to determine the at least one qualifying financial transaction, includes determining whether the transaction has been posted prior to a predetermined period.

20. The non-transitory computer readable medium of claim 15, wherein the predetermined value is determined based on an available maximum utilization amount available to a user and wherein the at least one qualifying financial transaction is transferred from at least one of a user's debit card or a bill pay financial transaction to the secured credit card.

* * * * *